United States Patent
Vikberg et al.

(10) Patent No.: US 8,504,055 B2
(45) Date of Patent: Aug. 6, 2013

(54) METHOD AND ARRANGEMENT FOR LOAD BALANCING IN A WIRELESS COMMUNICATION SYSTEM

(75) Inventors: Jari Vikberg, Järna (SE); Tomas Nylander, Värmdö (SE); Johan Rune, Lidingö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 206 days.

(21) Appl. No.: 13/143,805

(22) PCT Filed: Jun. 30, 2009

(86) PCT No.: PCT/SE2009/050840
§ 371 (c)(1),
(2), (4) Date: Jul. 8, 2011

(87) PCT Pub. No.: WO2010/080056
PCT Pub. Date: Jul. 15, 2010

(65) Prior Publication Data
US 2011/0269499 A1    Nov. 3, 2011

Related U.S. Application Data

(60) Provisional application No. 61/143,620, filed on Jan. 9, 2009.

(51) Int. Cl.
*H04W 36/00* (2009.01)
(52) U.S. Cl.
USPC ........... 455/453; 455/436; 455/437; 455/438; 455/439; 455/440; 455/441; 455/442; 455/443; 455/444; 370/401; 370/332; 370/331
(58) Field of Classification Search
USPC .................. 455/453, 436–444; 370/331–332, 370/401
See application file for complete search history.

(56) References Cited

U.S. PATENT DOCUMENTS
2003/0169712 A1    9/2003   Tsao

FOREIGN PATENT DOCUMENTS
EP           1 786 234         5/2007

OTHER PUBLICATIONS

International Search Report for PCT/SE2009/050840, mailed Oct. 21, 2009.
Samsung: "Removal of Editor's note on re-entrant to the MME pool area", 3GPP Draft; S2-082131, vol. SA WG2, No. Jeju island, KR, (Apr. 1, 2008), 15 pages.
Nokia Siemens Networks et al., "HeNBA s S1 simplification by means of HeNB GW", 3GPP Draft; R3-080155, vol. RAN WG3, No. Sorrento, IT, (Feb. 5, 2008), 7 pages.
Mitsubishi Electric: "Load sharing between MMEs of an MME pool area", 3GPP Draft; R3-071461, vol. RAN WG3, No. Athens, GR, (Aug. 15, 2007), 2 pages.
$3^{Rd}$ Generation Partnership Project: "General Packet Radio Service (GPRS) Enhancements for Evolved Universal Terrestrial Radio Access Network (E-UTRAN) access", Internet Citation, [Online], vol. 3GPP, No. TS23.401, pp. 11-20.

*Primary Examiner* — Charles Shedrick
(74) *Attorney, Agent, or Firm* — Nixon & Vanderhye P.C.

(57) ABSTRACT

The present invention relates to methods and arrangements in a wireless communication system that enable a load balancing procedure in a network with HeNB GWs. The problem of the ineffective conventional load balancing procedure when used in a network with HeNB GWs, is addressed by a solution where the HeNB includes (510) an explicit indication of the reason for radio link establishment (load balancing establishment cause) in the S1AP INITIAL UE MESSAGE message (511) used to establish the S1 signaling connection associated with a user equipment to an MME, so that the HeNB GW (550) can perform an accurate MME selection based on the knowledge that the establishment is due to load balancing, i.e. an MME selection that realizes the required inter-MME load balancing.

32 Claims, 10 Drawing Sheets

METHOD AND ARRANGEMENT FOR LOAD BALANCING IN A WIRELESS COMMUNICATION SYSTEM

This application is the U.S. national phase of International Application No. PCT/SE2009/050840, filed 30 Jun. 2009, which designated the U.S., and claims the benefit of U.S. Provisional No. 61/143,620, filed 9 Jan. 2009, the entire contents of each of which are hereby incorporated by reference.

TECHNICAL FIELD

The present invention relates to a method for load balancing in a wireless communication system, performed by a radio base station gateway, a radio base station, and a user equipment, as well as to a radio base station gateway, a radio base station, and a user equipment for a wireless communication system.

BACKGROUND

The Universal Mobile Telecommunication System (UMTS) is one of the third generation mobile communication technologies designed to succeed GSM. 3GPP Long Term Evolution (LTE) is a project within the 3$^{rd}$ Generation Partnership Project (3GPP) to improve the UMTS standard to cope with future requirements in terms of improved services such as higher data rates, improved efficiency, lowered costs etc. The Universal Terrestrial Radio Access Network (UTRAN) is the radio access network of a UMTS system and evolved UTRAN (E-UTRAN) is the radio access network of an LTE system. An E-UTRAN is connected to a mobile core network (CN) which is referred to as the Evolved Packet Core (EPC), also called System Architecture Evolution (SAE) network. The E-UTRAN and the EPC together with additional nodes, such as the Home Subscriber Server (HSS) form the Evolved Packet System (EPS), also known as the SAE/LTE network.

An SAE/LTE network architecture is illustrated in FIG. 1. The network typically comprises user equipments (UE) 150 wirelessly connected to radio base stations (RBS) 100, commonly referred to as eNodeBs (eNB). The eNB 100 serves an area referred to as a macro cell 110. In an E-UTRAN it is also possible to have a radio base station providing home or small area coverage for a limited number of user equipments. This radio base station is in 3GPP and in this document, referred to as a Home E-UTRAN NodeB 120 (HeNB). Other names used for this type of radio base station are LTE Home Access Point (LTE HAP) and LTE Femto Access Point (LTE FAP). The HeNB 120 provides the same service for the end users as an ordinary eNB 100. The coverage provided by a HeNB is in this document called a femto cell 130.

Since the current assumption in 3GPP standardization is that the X2 interface is not used with HeNBs, the X2 interface 140 is only shown between eNBs 100 in FIG. 1. All eNBs 100 are connected to the CN 160 via the S1 interface 170 using some kind of IP based transmission. The HeNBs 120 are connected to the CN 160 via a HeNB concentrator node, also referred to as a HeNB gateway 180 (HeNB GW). The S1 interface 170 is used between the HeNBs 120 and the HeNB GW 180 as well as between the HeNB GW 180 and the CN 160. A HeNB 120 would, in most cases, use the end user's already existing broadband connection (e.g. xDSL or cable) to achieve connectivity to the HeNB GW/CN 160.

One of the main drivers of the concept of providing wireless local access through a HeNB is to be bale to provide cheaper call or transaction rates when connected via an HeNB compared to when connected via an eNB.

A mobile network may have up to one million HeNBs. The CN control nodes interfacing the eNBs are referred to as Mobility Management Entities (MME) in SAE/LTE. The MMEs will not be able to handle such a large amount of HeNBs, as it is not reasonable for an MME to handle the load for that many S1 control parts (S1-MME). One purpose of the HeNB GW is thus to conceal the large number of HeNBs from the CN perspective. The CN will perceive the HeNB GW as one eNB with many cells, and the HeNB GW will act as an eNB proxy for all the HeNBs that are connected to the HeNB GW. The HeNB will perceive the HeNB GW as a CN node.

MME nodes are commonly grouped in MME pools. FIG. 2 illustrates an eNB 240 connected to an MME pool 210, comprising four MME nodes 220. The eNB 240 has S1 interfaces 260 to all members in an MME pool 210. Each MME 220 has a unique identity, called the Globally Unique MME Identity (GUMMEI), that is conveyed to the eNB 240 when the S1 interface is established. When a UE 250 attaches to the network and to an MME 220, it is allocated an identity called the Globally Unique Temporary Identity (GUTI). A GUTI consists of two parts, one part that identifies the MME which allocated the GUTI and which holds the UE context, and one part which identifies the UE within the MME. The part that identifies the MME is a GUMMEI, which in turn consists of a Public Land Mobile Network identity (PLMN ID), an MME group identity (MMEGI) which identifies the MME pool and an MME code (MMEC) which identifies the MME within the pool. The part of the GUTI that identifies the UE within the MME is called M-Temporary Mobile Subscriber Identity (TMSI). The combination of MMEC and M-TMSI is denoted S-TMSI. The S-TMSI is used for identification of the UE in situations where the PLMN ID and MMEGI are known.

In SAE/LTE, the tracking area (TA) concept replaces the UMTS routing area/location area. A UE in idle state is typically not transmitting or receiving any packets. As the UE is not in active communication with an eNB, its location may not be exactly known. A TA represents an area in which the UE was last registered, the area corresponding to one or multiple eNBs, and it is necessary to page the UE in the TA to locate the UE in a particular cell. A TA update (TAU) is generated when the UE crosses the boundary from one TA to another TA. To decrease the CN signaling, a UE can be assigned with more than one TA in its TA list. If one UE is assigned multiple TAs, the UE does not need to perform TAUs when it crosses the boundaries between assigned TAs, but as soon as the UE detects a TA identity (TAI) that is not in its TA list, a TAU is performed.

When a UE accesses an eNB to establish a Radio Resource Control (RRC) signaling connection, it identifies itself with the S-TMSI in the RRCConnectionRequest message, if the TAI of current cell is included in the UE's TAI list, i.e. if the UE is registered in the current TA. Otherwise the UE uses a random identity in the RRCConnectionRequest message. If the UE provides the S-TMSI, the eNB can use the MMEC part of the S-TMSI to figure out which MME that holds the UE context. The UE may also, e.g. when the UE is not registered in the current TA, indicate the MME in which it is registered by providing the GUMMEI of that MME in the RRCConnectionSetupComplete message, which concludes the RRC connection establishment procedure. When a UE accesses the eNB, for example to perform a TAU, the UE normally conveys its allocated GUTI in the TAU Request. The TAU request is a so called Non-Access Stratum (NAS) message, meaning that the message is sent transparently through the RBS. If the eNB cannot determine which MME the UE is registered in, or if the UE's registered MME belongs to an MME pool to which the eNB is not connected, the eNB selects an MME more or less at random, e.g. using a weighted round-robin algorithm.

FIG. 3 illustrates schematically an intra-MME load balancing procedure in a sequence diagram. A load balancing procedure may be needed to off-load an MME, e.g. for node maintenance reasons or because an MME in a pool is overloaded for some reason. The load balancing is achieved by performing a TAU according to the following procedure. The procedure's starting point is that a UE 320 has an active connection 301. An S1 connection has been established to an MME 340 and the UE 320 is registered in the MME 340. When the MME 340 decides to off-load for some reason, as in step 302, the MME 340 releases the UE 320 and indicates a specific load balancing cause for the release. More precisely, the MME 340 sends an S1AP UE CONTEXT RELEASE COMMAND message 303 to the eNB 330 with the cause information element set to 'load balancing TAU required'. The eNB 330 releases the UE's RRC connection by sending an RRCConnectionRelease message 304 to the UE 320 with the releaseCause set to 'load balancing TAU required'. As soon as this is done a S1AP UE CONTEXT RELEASE COMPLETE message 305 is returned to the MME 340 to confirm the connection release. The UE then initiates the establishment of a new RRC connection, for the purpose of performing the required load balancing TAU, by sending an RRCConnectionRequest 306 to the eNB 330, without including the S-TMSI, and with the establishmentCause set to a value indicating that the RRC connection is established for load balancing reasons. The eNB 330 responds with an RRCConnectionSetup message 307, and the UE 320 concludes the RRC connection establishment by sending an RRCConnectionSetupComplete message to the eNB 330, without including the GUMMEI of the MME in which the UE was registered. When a radio link is established due to load balancing, the eNB 330 thus knows that the establishment is due to load balancing, and will select an MME according to some default selection algorithm, as shown in step 309. As the eNB 330 does not know the identity of the previously used MME (neither the S-TMSI nor the GUMMEI is available), this MME cannot be excluded in the selection which means that it is still possible that the eNB selects the MME that needs to be off-loaded. The probability that the NAS TAU Request in the S1AP INITIAL UE MESSAGE 310 is sent to another MME 350 than the one previously used for this UE 320, depends on the number of MMEs in the pool. A UE context is created in the newly selected MME 350 when the TAU procedure continues 311.

FIG. 4 illustrates an example of an MME pool 410 with four MMEs 420 and a HeNB GW 430 connected to the MMEs 420. A number of HeNBs 440 covering a femto-cell 450 each within the macro-cells 460, are connected to the HeNB GW 430. Each HeNB 440 will only have one S1 interface 470 to the allocated HeNB GW 430, and the HeNB GW 430 is the entity that has multiple S1 interfaces 480 to the different MMEs 420 in a pool 410. The HeNB GW 430 will thus handle the selection of the MME 420 to use for a UE 490. The HeNB GW may base its MME selection on information acquired by snooping S1AP signaling messages on the S1 interface. Hence, the HeNB GW will select the MME based on the S-TMSI, which in most cases is included in the S1AP INITIAL UE MESSAGE message. At that point the HeNB GW also stores the identity of the eNB UE S1AP and associates it with a reference to the selected MME in a mapping table for the current S1 connections. For subsequent uplink S1AP messages, the HeNB GW identifies the correct MME by matching the identity of the eNB UE S1AP of the message with its stored mappings. If no information about how to select an MME is provided in an S1AP message, the HeNB GW selects the MME according to some default algorithm, e.g. weighted round-robin, just as described above for eNBs.

In the conventional MME load balancing procedure, as described above with reference to FIG. 3, the released UE establishes a radio link, by sending an RRCConnectionRequest to the eNB with establishment cause load balancing indicated and without including the S-TMSI. The UE also excludes the GUMMEI from the RRCConnectionSetupComplete message sent to the eNB. This procedure will not provide the wanted MME off-loading in a system with a HeNB GW (see FIG. 4), since the HeNB GW does not notice the radio link establishment handled in the HeNB, as the RRC signaling is terminated in the HeNB. The HeNB GW bases its MME selection on information in S1AP signaling messages on the S1 interface, as described above. However, neither the load balancing trigger information (i.e. the establishment cause) nor any identity of the registered MME (i.e. the MMEC in the S-TMSI) is included in the S1AP INITIAL UE MESSAGE message. Hence, the HeNB GW will, when applying the conventional load balancing procedure, select the MME according to some default algorithm, e.g. weighted round robin. In the presence of load balancing (i.e. an MME to be off-loaded) this MME selection procedure is suboptimal, since the HeNB GW will sometimes select the MME to be off-loaded, thereby increasing the load on the MME and thus counteracting the purpose of the load balancing procedure (the smaller MME pool the more frequently this problem will occur). This will in turn result in that MMEs and MME pools will function sub-optimally when a HeNB GW is connected, and this will affect not only UEs connected via HeNBs, but also UEs connected via macro layer eNBs.

Thus it still presents a problem to enable load balancing of core network control nodes in networks with RBS GWs.

SUMMARY

The object of the present invention is to address the problem outlined above. This object and others are achieved by the methods, the radio base station gateway, the radio base station and the UE according to the appended independent claims, and by the embodiments according to the dependent claims.

In accordance with a first aspect of the present invention, a method for load balancing performed in a radio base station gateway in a wireless communication system is provided. The wireless communication system provides a wireless service to at least one active user equipment, where a radio base station gateway is connected to at least two core network control nodes and to at least two radio base stations. The method comprises the step of receiving a command for releasing a signaling connection associated with a user equipment due to load balancing, the command received from one of the core network control nodes in which at least one of the active user equipments is registered. It also comprises the step of receiving a message comprising a request for a signaling connection to a core network control node and a load balancing establishment cause, the message received from one of the radio base stations. Furthermore, it comprises the step of selecting a core network control node based on said load balancing establishment cause, when establishing the requested signaling connection.

In accordance with a second aspect of the present invention, a method for load balancing performed in a radio base station in a wireless communication system is provided. The wireless communication system provides a wireless service to at least one active user equipment, where a radio base station gateway is connected to at least two core network control nodes and to at least two radio base stations. The method comprises the step of receiving a connection request from a user equipment, the connection request initiating a connection establishment and comprising a load balancing establishment cause. It also comprises the step of sending a first message to the radio base station gateway, this first message comprising a request for a signaling connection to a core network control node and a load balancing establishment cause.

In accordance with a third aspect of the present invention, a method for load balancing performed in a user equipment in a wireless communication system is provided. The wireless communication system provides a wireless service to at least one active user equipment, where a radio base station gateway is connected to at least two core network control nodes and to at least two radio base stations. The method comprises the step of transmitting a connection request to a radio base station, the connection request initiating a connection establishment and comprising a load balancing establishment cause. The method also comprises the step of transmitting an identity of a core network control node in which the user equipment is registered.

In accordance with a fourth aspect of the present invention, a radio base station gateway for a wireless communication system adapted to provide a wireless service to at least one active user equipment is provided. The radio base station gateway is connectable to at least two core network control nodes and to at least two radio base stations, and comprises a command receiving unit. The command receiving unit is arranged to receive a command for releasing a signaling connection associated with a user equipment due to load balancing, where the command is received from one of the core network control nodes in which at least one of said active user equipments is registered. The radio base station gateway also comprises a message receiving unit, arranged to receive a message comprising a request for a signaling connection to a core network control node and a load balancing establishment cause, where the message is received from one of the radio base stations. It also comprises a selecting unit arranged to select a core network control node based on the load balancing establishment cause when establishing the requested signaling connection.

In accordance with a fifth aspect of the present invention, a radio base station for a wireless communication system adapted to provide a wireless service to at least one active user equipment is provided. The radio base station is connectable to a radio base station gateway, and the gateway is connectable to at least two core network control nodes. The radio base station comprises a receiving unit, arranged to receive a connection request from a user equipment, where the connection request initiates a connection establishment and comprises a load balancing establishment cause. It also comprises a sending unit, arranged to send a first message to the radio base station gateway. The first message comprises a request for a signaling connection to a core network control node and a load balancing establishment cause.

In accordance with a sixth aspect of the present invention, a user equipment for a wireless communication system comprising a radio base station gateway connectable to at least two core network control nodes and to at least two radio base stations is provided. The user equipment comprises a transmitter, arranged to transmit a connection request to a radio base station. The request initiates a connection establishment and comprises a load balancing establishment cause. The transmitter is further arranged to transmit an identity of a core network control node in which said user equipment is registered, to the radio base station.

An advantage of embodiments of the present invention is that the load balancing procedure for core network control nodes will provide the wanted load balancing result in a network with RBS GWs.

A further advantage of embodiments of the present invention is that the core network control nodes may work in an optimal way in a network with RBS GWs.

DETAILED DESCRIPTION

Figure 1:
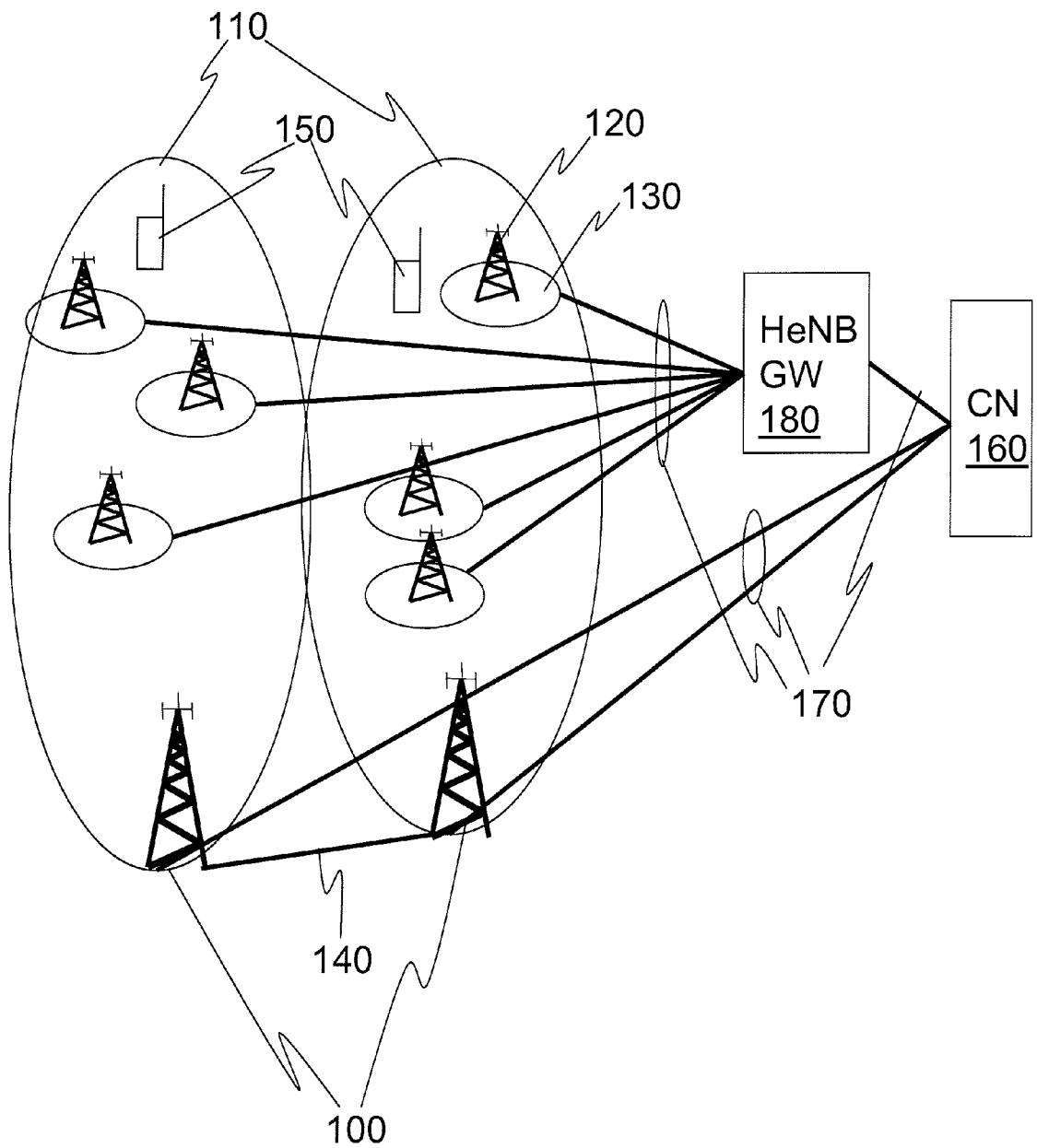
FIG. 1 illustrates schematically a conventional wireless communication system wherein the present invention may be implemented.
Figure 2:
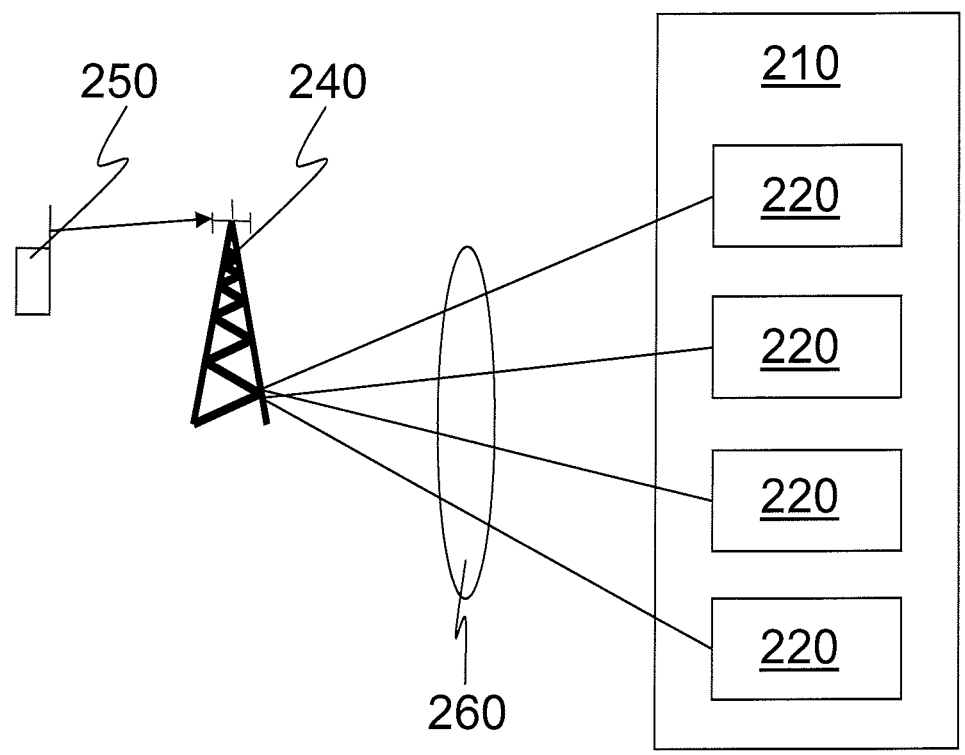
FIG. 2 illustrates schematically a radio base station connected to an MME pool.
Figure 3:
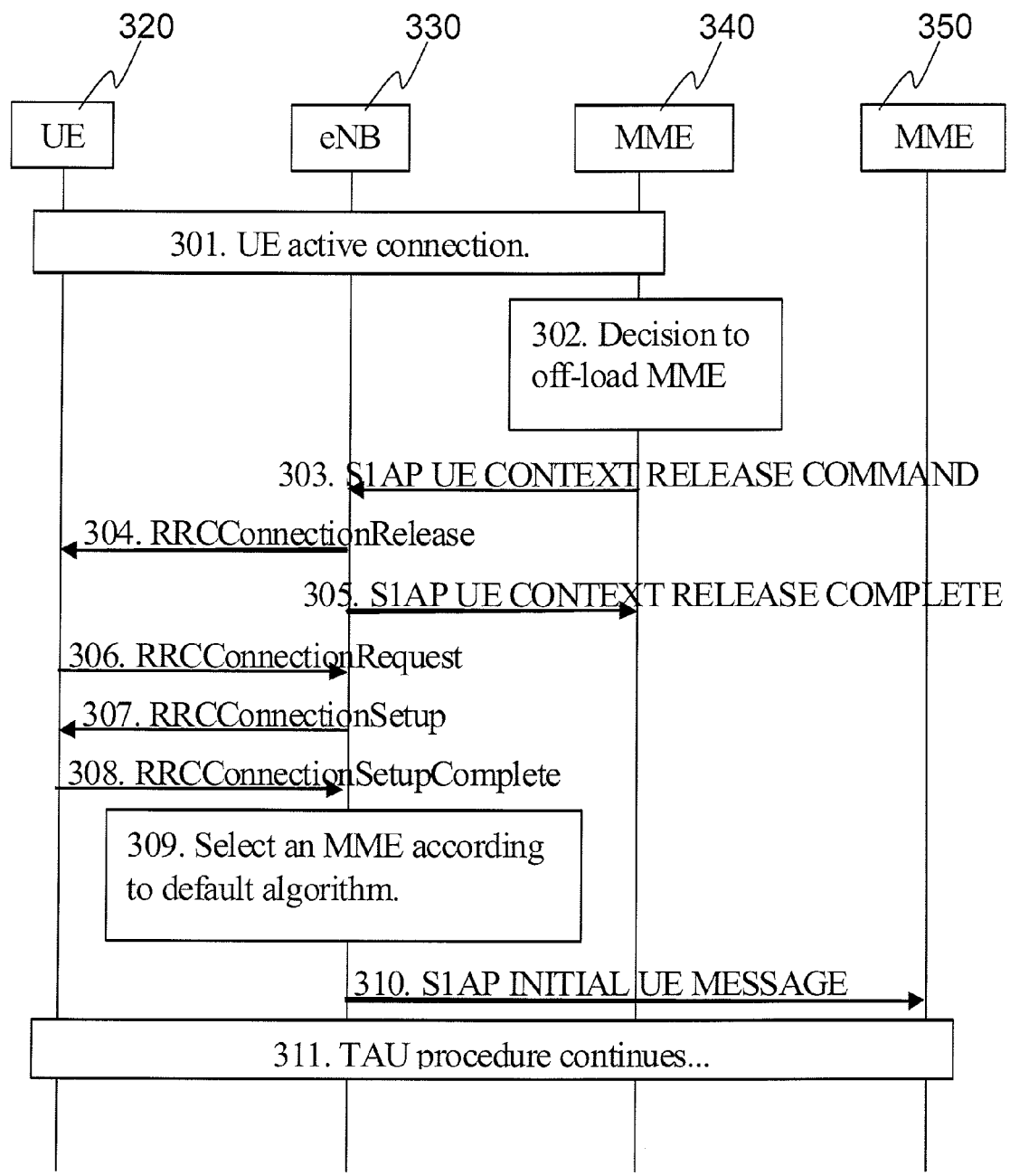
FIG. 3 illustrates schematically a sequence diagram of the conventional intra-MME pool load balancing procedure.
Figure 4:
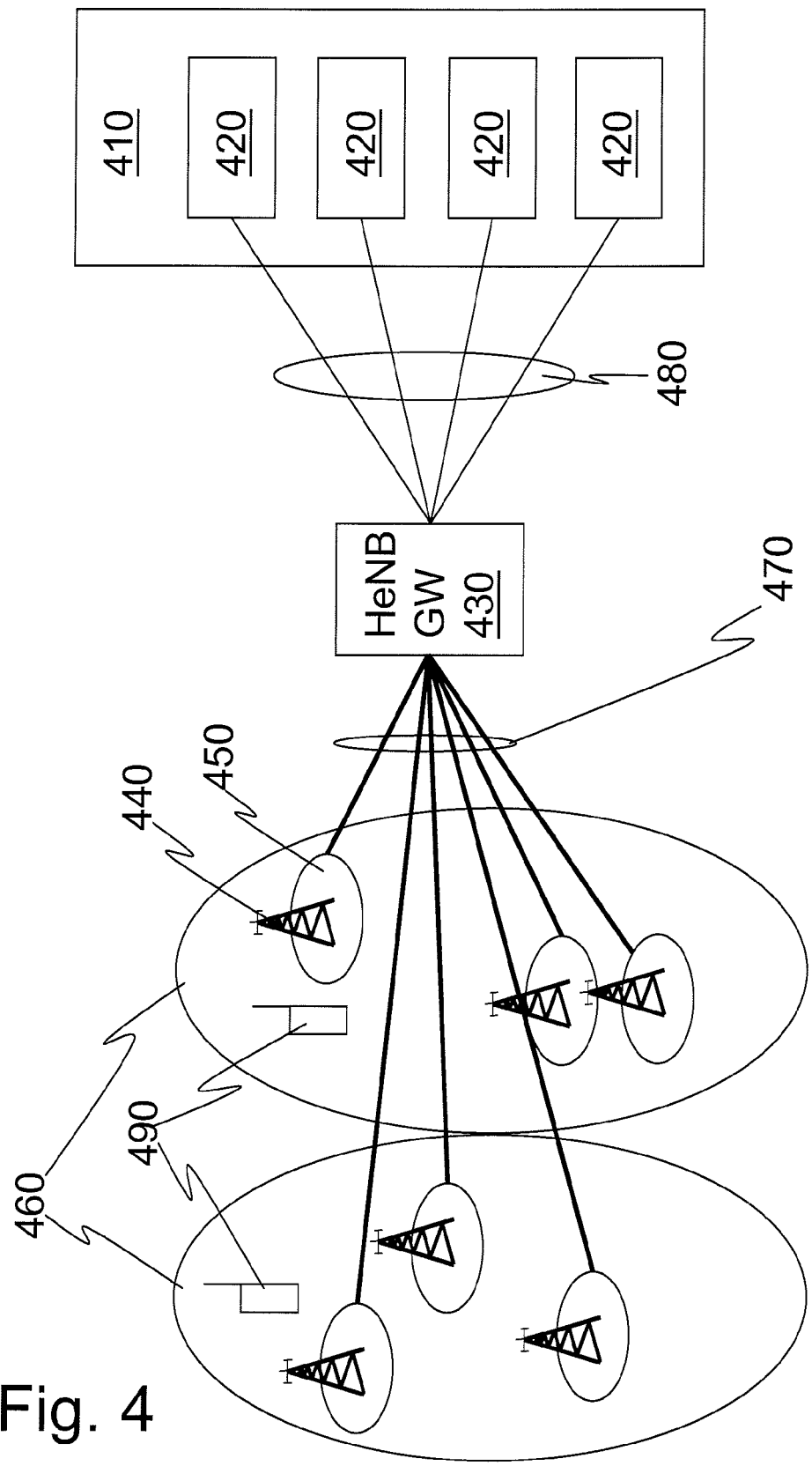
FIG. 4 illustrates schematically a conventional wireless communication system wherein the present invention may be implemented.

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to a 3GPP SAE/LTE system and to HeNBs and HeNB GWs. It should though be noted that the invention and its exemplary embodiments may also be applied to other types of radio access technologies such as UTRAN and WiMax, as well as other radio base stations such as micro base stations and corresponding radio base station gateways, and other core network control nodes.

In the present invention, the problem of the ineffective conventional load balancing procedure when used in a network with RBS GWs, such as an SAE/LTE network with HeNB GWs, is addressed by a solution where the HeNB includes an explicit indication of the reason for radio link establishment (load balancing establishment cause) in the S1AP INITIAL UE MESSAGE used to establish the S1 signaling connection to an MME (the core network control node), so that the HeNB GW can perform a correct MME selection based on the knowledge that the establishment is due to load balancing. A correct MME selection is an MME selection that realizes the required inter-MME load balancing.

In a first embodiment of the present invention, the UE, in accordance with conventional procedures, will not include the S-TMSI in the RRCConnectionRequest message to the HeNB, which means that the S1AP INITIAL UE MESSAGE message sent from the HeNB to the HeNB GW will not comprise any information regarding the identity of the previously used MME. However, as described above, the HeNB includes an explicit indication of MME load balancing through a load balancing establishment cause in the S1AP INITIAL UE MESSAGE message that carries the load balancing TAU from the UE. The HeNB GW will also, in order to be able to do a correct MME selection without having knowledge of the previously used MME identity, keep track of the difference between the number of UEs that an MME has released for load balancing reasons and the number of UEs that have been redirected to other MMEs for the same reason. This is realized through a counting device for each MME in the pool, maintained in the HeNB GW. When the HeNB receives a command for releasing a signaling connection associated with a user equipment due to load balancing from a certain MME, the corresponding counting device value will be increased by one. When the HeNB GW subsequently receives an S1AP INITIAL UE MESSAGE message with a request for a signaling connection to an MME and with a load balancing establishment cause, the selection of the MME will depend on the value of the counting devices. The HeNB GW will select an MME randomly among those with a counting device value that equals zero, as those MMEs have not released any UEs due to load balancing and may thus take on more load. When an MME has been selected, the HeNB will also decrease the value of one of the counting devices which has a value larger than zero, as one UE has been redirected from an MME which is overloaded or in need of maintenance to an MME which is not over-loaded or in need of maintenance. This procedure will thus ensure that the selection of MME results in the required load balancing. The counting devices may also be used to avoid selecting MMEs that have indicated an off-loading need in the case of an ordinary TAU request. When an MME counting device is larger than zero, the corresponding MME will be excluded when performing the selection algorithm.

Figure 5A:
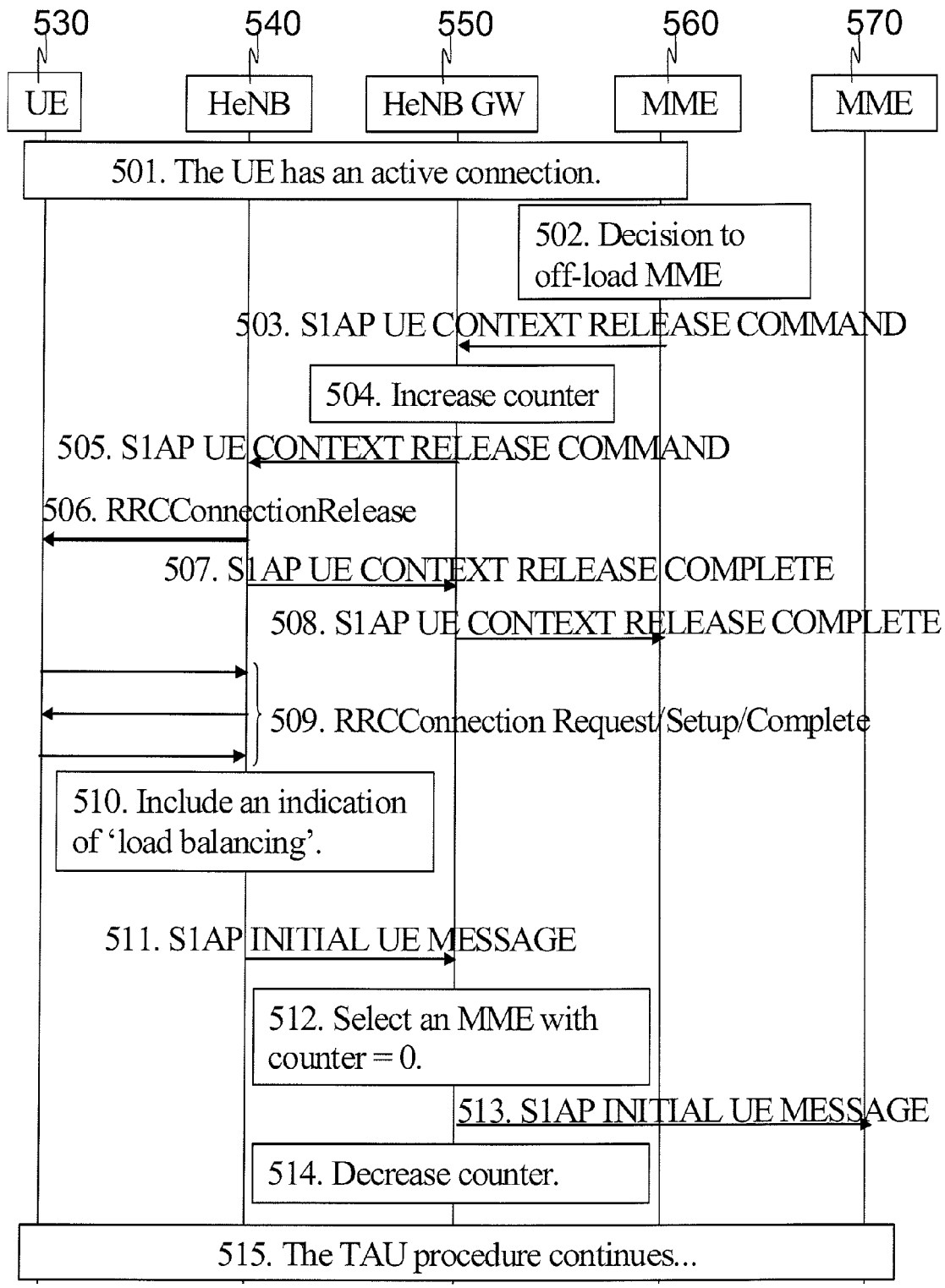
FIGS. 5a-b illustrate schematically sequence diagrams of the intra-MME pool load balancing procedure according to embodiments of the present invention.

The load balancing procedure according to this first embodiment of the present invention is schematically illustrated in the sequence diagram in FIG. 5a. In an initial phase 501, the UE 530 has an active connection and is using a certain MME 560. In step 502, a decision to off-load the MME 560 is taken, e.g. triggered by an operation and maintenance command. As a consequence, the UE 530 with an active connection should be moved to another MME. The MME 560 initiates the load balancing procedure by releasing the UE's signaling connection. This is done by sending an S1AP UE CONTEXT RELEASE COMMAND message 503 with the Cause information element set to 'load balancing TAU required'. The HeNB GW 550 receives the S1AP UE CONTEXT RELEASE COMMAND message 503 from the MME 560, and increases, in step 504, the value of the counting device corresponding to the MME 560 by one before forwarding the command message 505 to the HeNB 540. The HeNB 540 receives the S1AP UE CONTEXT RELEASE COMMAND message 505 and consequently sends an RRC-ConnectionRelease message 506 to the UE 530 with the releaseCause set to 'load balancing TAU required'. The HeNB 540 confirms the connection release by sending an S1AP UE CONTEXT RELEASE COMPLETE message 507 to the HeNB GW 550, which forwards a S1AP UE CONTEXT RELEASE COMPLETE message 508 to the MME 560.

After receiving the RRCConnectionRelease message 506 with the releaseCause set to 'load balancing TAU required', the UE 530 initiates the establishment of a new RRC connection in step 509 by sending an RRCConnectionRequest message to the HeNB 540 with the establishmentCause indicating load balancing reasons (and without including an S-TMSI). The HeNB 540 responds with an RRCConnectionSetup message, and the RRC connection establishment in step 509 is concluded when the UE 530 sends an RRCConnectionSetupComplete message to the HeNB 540. The NAS message from the UE 530, i.e. the TAU Request, is piggybacked on the RRCConnectionSetupComplete message. Since the HeNB 540 only knows about a single "MME" represented by the HeNB GW 550, it cannot select any other MME and the S1 connection will be established via the HeNB GW 550. Triggered by the load balancing Establishment Cause in the RRC-ConnectionRequest message from the UE 530, the HeNB 540 includes, in step 510, a corresponding load balancing establishment cause in the subsequently sent S1AP INITIAL UE MESSAGE 511 message. The TAU Request message received from the UE 530 is also included in the S1AP INITIAL UE MESSAGE message 511. When the HeNB GW 550 receives the S1AP INITIAL UE MESSAGE message 511 from the HeNB 540, it is triggered by the load balancing establishment cause to read the counting device values for the different MMEs and to select, in step 512, an MME 570 corresponding to a counting device which has a value zero, as such an MME does not need to be off-loaded and may thus take on the load from the UE. The HeNB GW 550 forwards the S1AP INITIAL UE MESSAGE message 513 to the selected MME 570. The HeNB GW 550 may or may not include the load balancing establishment cause in the forwarded message. In step 514 the HeNB GW decreases (by one) a counting device, which has a value greater than zero, reflecting the fact that one UE has been redirected to another MME and that an MME thus has been off-loaded one UE. In the final phase 515, the TAU continues according to the regular procedure.

In a second embodiment of the present invention, the UE will include S-TMSI in the RRCConnectionRequest to the HeNB, even though the establishment cause is load balancing, which means that the S1AP INITIAL UE MESSAGE sent from the HeNB to the HeNB GW also may comprise information regarding the identity of the previously used MME, as the S-TMSI comprises MMEC which identifies the MME within the MME pool. As described above, the HeNB will also include an explicit indication of MME load balancing through a load balancing establishment cause in the S1AP INITIAL UE MESSAGE message that carries the load balancing TAU Request from the UE. The HeNB GW will, when receiving a S1AP INITIAL UE MESSAGE message with a request for a signaling connection to an MME, the S-TMSI, and a load balancing establishment cause, retrieve the MMEC from the S-TMSI contained in the S1AP message, and select another MME than the one indicated by the MMEC. In an alternative embodiment, the UE will not include the S-TMSI in the RRCConnectionRequest message, but will instead include the GUMMEI in the RRCConnectionSetupComplete message (or alternatively in the RRCConnectionRequest message) sent to the HeNB. According to this embodiment the HeNB then includes the GUMMEI, or alternatively only the MMEC part of the GUMMEI, in the S1AP INITIAL UE MESSAGE message to the HeNB GW and the HeNB GW will select another MME than the one indicated by the GUMMEI (or MMEC). This procedure will thus ensure that the selection of MME results in the requested load balancing.

Figure 5B:
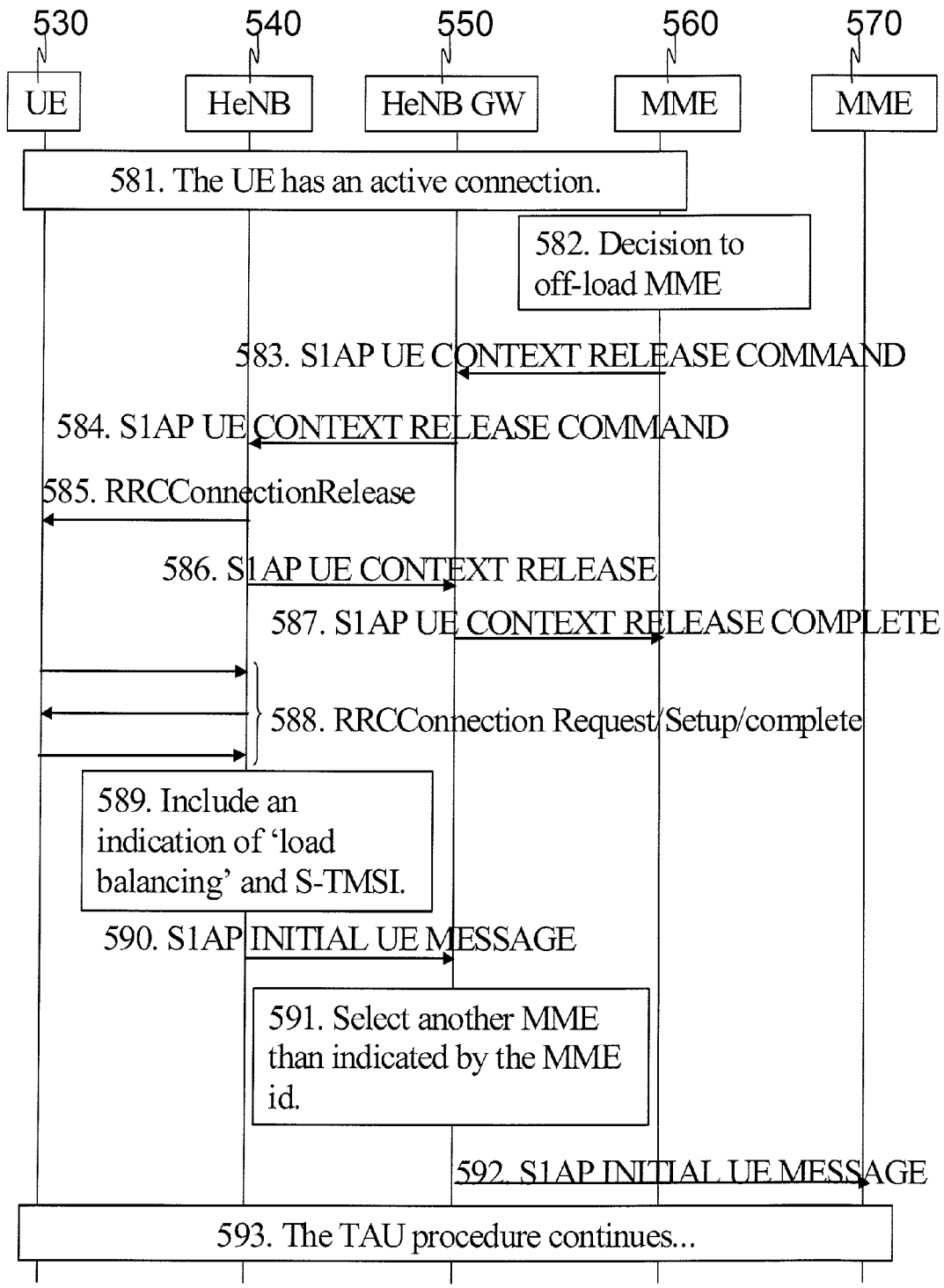

The load balancing procedure according to this second embodiment of the present invention is schematically illustrated in the sequence diagram in FIG. 5b. In an initial phase 581, the UE 530 has an active connection. In step 582, a decision to off-load the MME 560 is taken, e.g. triggered by an operation and maintenance command. As a consequence, the UE 530 with an active connection should be moved to another MME. The MME 560 initiates the load balancing procedure by releasing the UE's connection. This is done by sending an S1AP UE CONTEXT RELEASE COMMAND message 583 with the Cause information element set to 'load balancing TAU required'. The HeNB GW 550 receives the S1AP UE CONTEXT RELEASE COMMAND message 583 from the MME 560, and forwards the command message 584 to the HeNB 540. The HeNB 540 receives the S1AP UE CONTEXT RELEASE COMMAND message 584 and consequently sends an RRCConnectionRelease message 585 to the UE 530 with the releaseCause set to 'load balancing TAU required'. The HeNB 540 confirms the connection release by sending an S1AP UE CONTEXT RELEASE COMPLETE message 586 to the HeNB GW 550, which forwards a S1AP UE CONTEXT RELEASE COMPLETE message 587 to the MME 560. After receiving the RRCConnectionRelease message 585 with the releaseCause set to 'load balancing TAU required', the UE 530 initiates the establishment of a new RRC connection in step 588 by sending an RRCConnectionRequest to the HeNB 540, including the S-TMSI, and with the establishmentCause indicating load balancing. The HeNB 540 responds with an RRCConnectionSetup message, and the RRC connection establishment in step 588 is concluded when the UE 530 sends an RRCConnectionSetupComplete message to the HeNB 540. The NAS message from the UE 530, i.e. the TAU Request, is piggybacked on the RRCConnectionSetupComplete message. Since the HeNB 540 only knows about a single "MME" represented by the HeNB GW 550, it cannot select any other MME and the S1 connection will be established via the HeNB GW 550. Triggered by the load balancing establishment cause in the RRCConnectionRequest message from the UE 530, the HeNB 540 includes, in step 589, a corresponding load balancing establishment cause in the subsequently sent S1AP INITIAL UE MESSAGE message 590, as well as the S-TMSI. The TAU Request message received from the UE 530 is also included in the S1AP INITIAL UE MESSAGE message 590. When the HeNB GW 550 receives the S1AP INITIAL UE MESSAGE message 590 from the HeNB 540, it is triggered by the load balancing establishment cause to select, in step 591, another MME 570 than the one indicated by the MMEC in the S-TMSI. The HeNB GW 550 then forwards the S1AP INITIAL UE MESSAGE message 592 to the selected MME 570. The HeNB GW 550 may or may not include the load balancing establishment cause in the forwarded message. In the final phase 593, the TAU continues according to the regular procedure. In an alternative embodiment the UE 530, in step 588, includes the GUMMEI in the RRCConnectionSetupComplete message (or alternatively in the RRCConnectionRequest message) instead of including the S-TMSI in the RRCConnectionRequest message. The HeNB 540 then, in step 589, includes the GUMMEI, or alternatively only the MMEC part of the GUMMEI, in the S1AP INITIAL UE MESSAGE message 590 to the HeNB GW 550. Still in accordance with the alternative embodiment, the HeNB GW 550, when it receives the S1AP INITIAL UE MESSAGE message 590 from the HeNB 540, is triggered by the load balancing establishment cause to select, in step 591, another MME 570 than the one indicated by the GUMMEI (or MMEC).

As an alternative, the presence of the S-TMSI, GUMMEI or MMEC in the S1AP INITIAL UE MESSAGE message 590 may be used as an implicit indication of load balancing establishment cause, in which case the explicit load balancing establishment cause indication becomes redundant and may be omitted. When the HeNB GW 550 forwards the S1AP INITIAL UE MESSAGE message 592 to the selected MME 570, it may or may not include the load balancing establishment cause and/or the S-TMSI, GUMMEI or MMEC.

In a third embodiment of the present invention, the HeNB includes an explicit indication of MME load balancing through a load balancing establishment cause indication in the S1AP INITIAL UE MESSAGE message that carries the load balancing TAU Request from the UE. When receiving an S1AP INITIAL UE MESSAGE message with a request for a signaling connection to an MME and a load balancing establishment cause, the HeNB GW extracts the TAU Request from the S1AP INITIAL UE MESSAGE message, retrieves the GUTI from the TAU Request message and checks the GUMMEI (in particular the MMEC part of the GUMMEI) which is included in the GUTI. This is possible since NAS messages including Attach Request and (non-periodic) TAU Request messages are sent without UE-to-MME encryption. The UE then selects another MME than the one identified by the GUMMEI/MMEC and forwards the S1AP INITIAL UE MESSAGE message (including the TAU Request) to the selected MME. This procedure thus ensures that the selection of MME results in the requested load balancing.

Figure 6A:
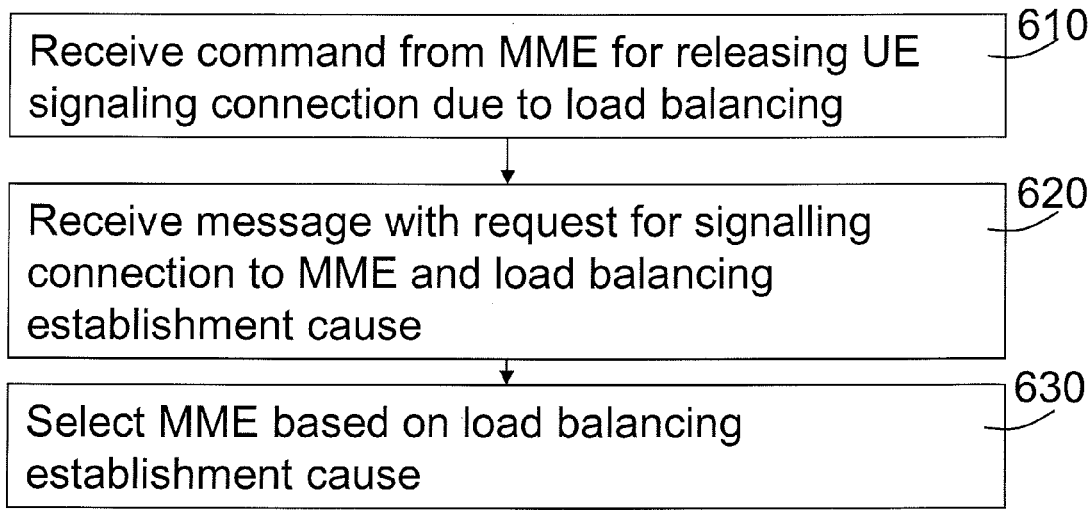
FIGS. 6a-c are flowcharts of the methods in the RBS GW, i.e. the HeNB GW, according to embodiments of the present invention.

FIG. 6a is a flowchart of the method in the RBS GW according to an embodiment of the present invention. In this embodiment, the wireless communication system is exemplified by an SAE/LTE system, the core network control nodes correspond to MMEs, the RBSs are HeNBs, and the RBS GWs are HeNB GWs. The method comprises the steps:

610: Receive a command for releasing a signaling connection associated with an active user equipment due to load balancing from one of the MMEs in which the active user equipment is registered. This is the S1AP UE CONTEXT RELEASE COMMAND message with the cause set to 'load balancing TAU required'. This command is then forwarded to the HeNB.

620: Receive a message from a HeNB comprising a request for a signaling connection to an MME and a load balancing establishment cause. This tells the HeNB GW that this request for a signaling connection to an MME is due to that the previously used MME needs to be off-loaded.

630: Select an MME based on said load balancing establishment cause, when establishing the requested signaling connection. The HeNB will select another MME than the one previously used as it knows that it is a load balancing situation.

Figure 6B:
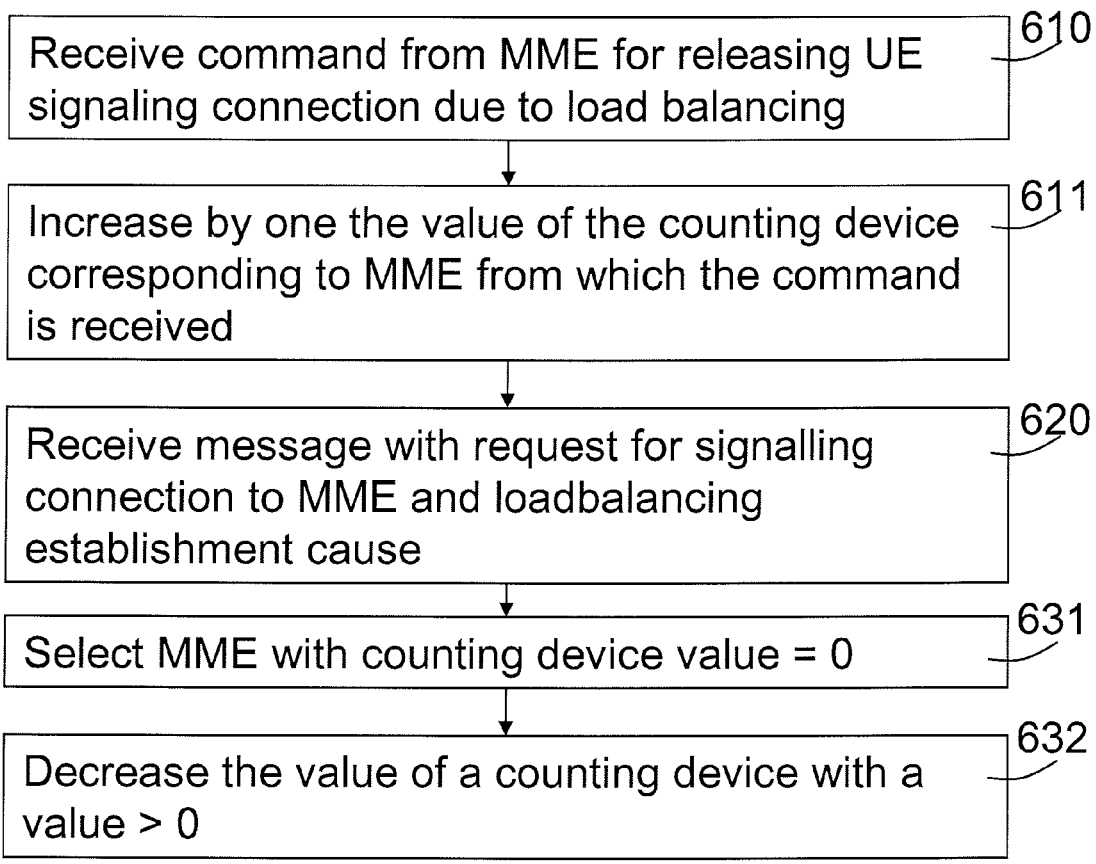

FIG. 6b is a flowchart of the method in the HeNB GW according to the first embodiment of the present invention described above, where the HeNB GW comprises counting devices per MME in order to select MME in an adequate way in a load balancing situation. The method comprises the steps:

610: Receive a command for releasing a signaling connection associated with an active user equipment due to load balancing from one of the MMEs in which the active user equipment is registered. This is the S1AP UE CONTEXT RELEASE COMMAND message with the cause set to 'load balancing TAU required'. This command is then forwarded to the HeNB.

611: Increase by one the value of the counting device corresponding to the MME from which the command message is received.

620: Receive a message from a HeNB comprising a request for a signaling connection to an MME and a load balancing establishment cause. This tells the HeNB GW that this request for a signaling connection to an MME is due to that the previously used MME needs to be off-loaded.

631: Select an MME which corresponds to a counting device with value zero. A counting device which is larger than zero corresponds to an MME which has released a UE for load balancing reasons, and such an MME should thus not be selected.

632: Decrease by one the value of one of said counting devices which has a value larger than zero. If the value of a counting device corresponding to a specific MME has been increased by one when the MME has released a UE due to load balancing, the counting device value should be decreased when a UE has been redirected to another MME.

Figure 6C:
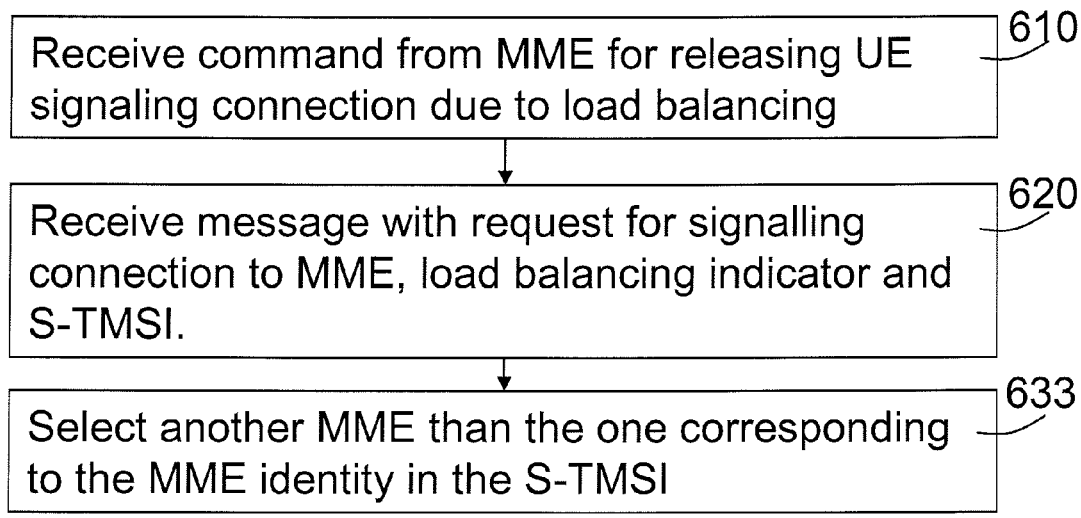

FIG. 6c is a flowchart of the method in the HeNB GW according to the second embodiment of the present invention described above. It comprises the steps:

610: Receive a command for releasing a signaling connection associated with an active user equipment due to load balancing from one of the MMEs in which the active user equipment is registered. This is the S1AP UE CONTEXT RELEASE COMMAND message with the cause set to 'load balancing TAU required'. This command is then forwarded to the HeNB.

620: Receive a message from a HeNB comprising a request for a signaling connection to an MME and a load balancing establishment cause, but also the S-TMSI of the UE requesting a connection. An alternative is to include the GUMMEI, or the MMEC part of the GUMMEI, instead of the S-TMSI in the message. This tells the HeNB GW that this request for a signaling connection to an MME is due to that the MME previously used by the UE, identified by the MMEC in the S-TMSI (or the GUMMED, needs to be off-loaded. If the GUMMEI, or the MMEC part of the GUMMEI is included in the message, the presence of this identifier in the message may be used as an implicit indication of load balancing establishment cause.

633: Select another MME than the one identified by the MMEC in the S-TMSI (or the GUMMEI), when establishing the requested signaling connection.

A similar approach as in the second embodiment is used in the third embodiment of the present invention. The difference is that the HeNB GW uses the user equipment identifier (the GUTI) in the TAU Request extracted from the S1AP INITIAL UE MESSAGE message to identify which MME that should be excluded when selecting MME in step 633.

Figure 7A:
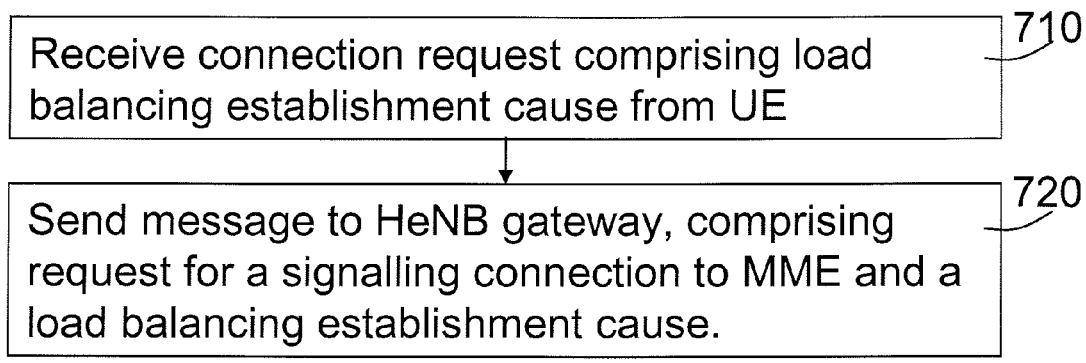
FIGS. 7a-b are flowcharts of the methods in the RBS, i.e. the HeNB, according to embodiments of the present invention.

FIG. 7a is a flowchart of the method in the RBS (HeNB) according to an embodiment of the present invention. The method comprises the following steps:

710: A connection request is received from a UE and the connection request comprises a load balancing establishment cause.

720: A message is sent to the HeNB GW comprising a request for a signaling connection to an MME and a load balancing establishment cause. This will make it possible for the HeNB GW to select an appropriate MME.

Figure 7B:
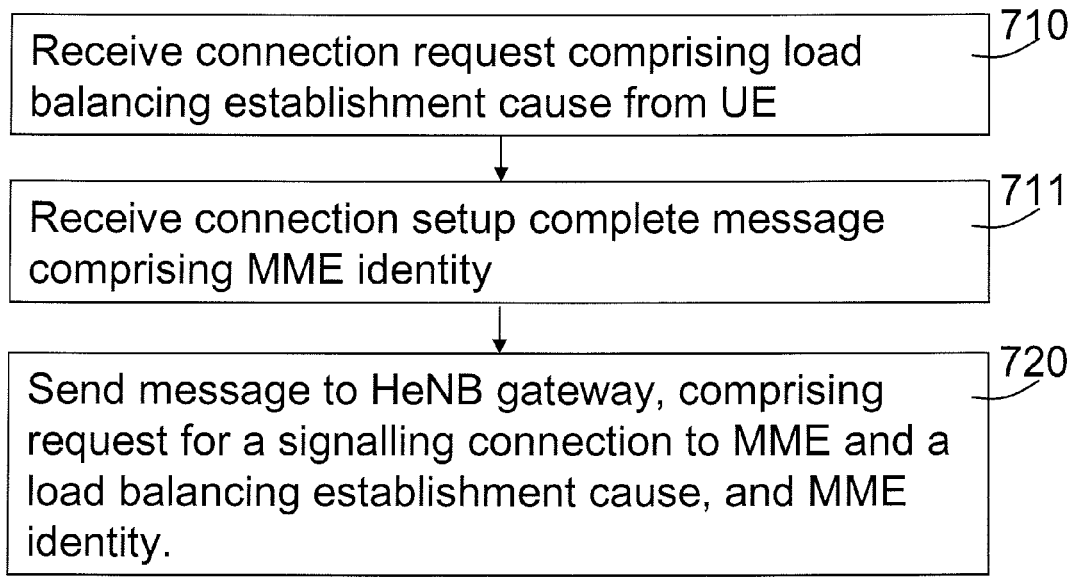

FIG. 7b is a flowchart of the method in the RBS (HeNB) according to an alternative of the second embodiment of the present invention. The method comprises the following steps. A connection request is received from a UE in step 710 and the connection request comprises a load balancing establishment cause. The connection request also comprises an identity of the MME in which the UE is registered, either as part of the S-TMSI of the UE from which the request is received, or as the GUMMEI of the MME. In the alternative embodiment of FIG. 7b, the GUMMEI is received, in step 711, in the concluding message of a connection establishment procedure, e.g. an RRCConnectionSetupComplete message. In step 720, a message is sent to the HeNB GW comprising a request for a signaling connection to an MME and a load balancing establishment cause. In this second embodiment, the message also comprises the identity of the MME in which the UE is registered (S-TMSI or GUMMEI or the MMEC part of the GUMMEI) received in the final message of the connection establishment procedure from the UE as in this embodiment, alternatively in the connection request.

Figure 8:
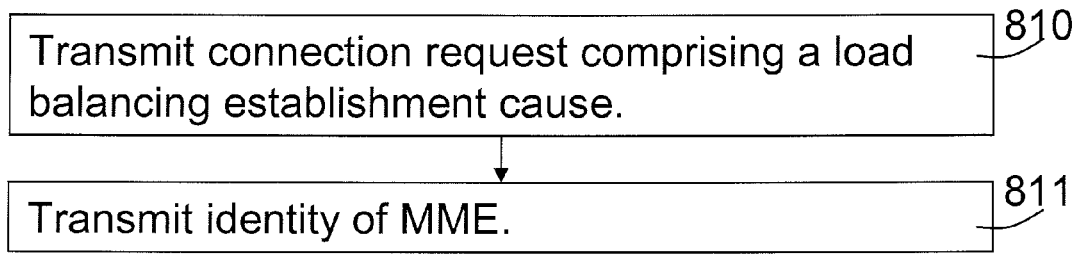
FIG. 8 is a flowchart of the method in the UE according to an embodiment of the present invention.

FIG. 8 is a flowchart of the method in the UE according to the second embodiment of the present invention. The method comprises the step 810 of transmitting a connection request to the HeNB comprising a load balancing establishment cause. The method also comprises the step 811 of transmitting an identity of the MME in which the UE is registered. The MME identity could either be the GUMMEI, or it could be comprised in the S-TMSI of the UE. The MME identity may in one alternative be transmitted in the connection request. In another alternative the GUMMEI is included in the final message of a connection establishment procedure, e.g. an RRCConnectionSetupComplete message, instead of in the initial connection request.

Figure 9:
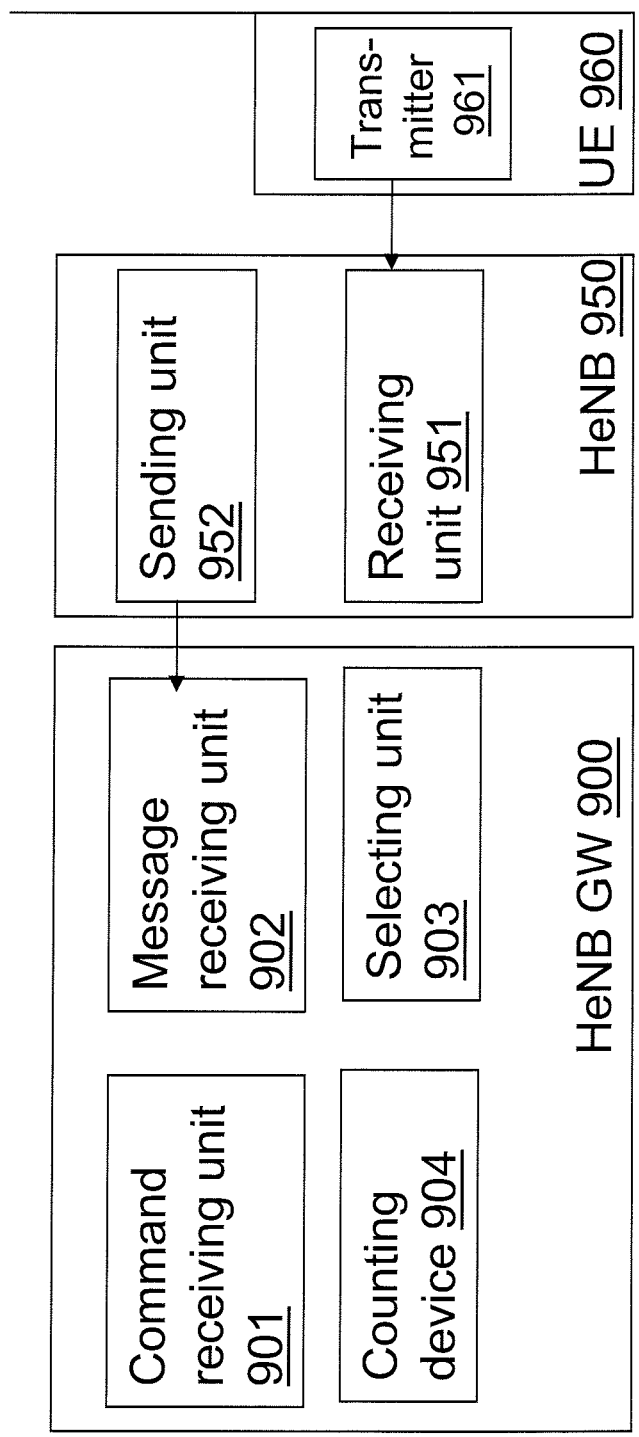
FIG. 9 illustrates schematically the RBS GW (HeNB GW), the RBS (HeNB) and the UE according to embodiments of the present invention.

Schematically illustrated in FIG. 9, and according to embodiments of the present invention, is a HeNB GW 900, a HeNB 950 and a UE 960. Also here, the wireless communication system is an SAE/LTE system, the core network control nodes correspond to MMEs, the RBSs are HeNBs, and the RBS GWs are HeNB GWs.

The HeNB GW 900 comprises a command receiving unit 901, for receiving a command from an MME for releasing a signaling connection associated with a UE 960 due to load balancing. It also comprises a message receiving unit 902, for receiving a message from the HeNB 950 comprising a request for a signaling connection to an MME and a load balancing establishment cause, and a selecting unit 903, for selecting an MME based on the load balancing establishment cause when establishing the requested signaling connection. In the first embodiment described above, the HeNB GW 900 also comprises a counting device 904 for each of the MMEs, and the command receiving unit 901 is arranged to increase by one the value of the counting device 904 corresponding to the MME from which the command is received. In this first embodiment, the selecting unit 903 is arranged to select an MME which has a counting device value that equals zero, and to decrease by one the value of one of said counting devices which has a value larger than zero.

In the second embodiment of the present invention, when the received message also comprises the S-TMSI or the GUMMEI (or the MMEC part of the GUMMEI) giving the identity of the MME in which the UE 960 is registered, the selecting unit 903 in the HeNB GW 900 is arranged to select another MME than the one corresponding to the MME identity given by the S-TMSI or GUMMEI (or MMEC part of the GUMMED. In the third embodiment of the present invention, the UE identifier is the GUTI comprised in the NAS message, i.e. the TAU Request message. The TAU Request message thus needs to be extracted from the received message, to retrieve the GUTI and read the MME identity in the form of the GUMMEI (or the MMEC part of the GUMMEI) in the GUTI. The selecting unit 903 is arranged to select another MME than the one corresponding to the MME identity given by the GUMMEI (or MMEC part of the GUMMED.

The HeNB 950 comprises a receiving unit 951 arranged to receive a connection request comprising a load balancing establishment cause from a UE, and a sending unit 952 arranged to send a message to the HeNB GW 900, comprising a request for a signaling connection to an MME and a load balancing establishment cause. In the second embodiment, the connection request will also comprise an S-TMSI or a GUMMEI, and the sending unit 952 will be arranged to send a message comprising also this S-TMSI or the GUMMEI (or the MMEC part of the GUMMED. The receiving unit 951 may also be arranged to receive the GUMMEI from the UE in the final message of a connection establishment procedure, e.g. an RRCConnectionSetupComplete message. If the GUMMEI, or the MMEC part of the GUMMEI is included in the message that the sending unit 952 sends, the presence of this identifier in the message may be used as an implicit indication of load balancing establishment cause, in which case the explicit load balancing establishment cause indication becomes redundant and may be omitted.

The UE 960 comprises a transmitter 961 arranged to transmit a connection request to a HeNB 950 comprising a load balancing establishment cause. According to the second embodiment, the connection request also comprises an MME identity (S-TMSI or GUMMED. As an alternative, the transmitter 961 may be arranged to include the GUMMEI in a final message of a connection establishment procedure, e.g. an RRCConnectionSetupComplete message.

The above mentioned and described embodiments are only given as examples and should not be limiting to the present invention. Other solutions, uses, objectives, and functions within the scope of the invention as claimed in the accompanying patent claims should be apparent for the person skilled in the art.

Abbreviations
3GPP 3$^{rd}$ Generation Partnership Project
CN Core Network
eNB eNodeB, E-UTRAN NodeB
EPC Evolved Packet Core
EPS Evolved Packet System
E-UTRAN Evolved UTRAN
FAP Femto Access Point
GUMMEI Globally Unique MME Identity
GUTI Globally Unique Temporary Identity
GW Gateway
HAP Home Access Point
HeNB Home eNB
HeNB GW Home eNB Gateway
LTE Long Term Evolution
MCC Mobile Country Code
MME Mobility Management Entity
MMEC MME Code
MMEGI MME Group Identity
MNC Mobile Network Code
M-TMSI M-Temporary Mobile Subscriber Identity
NAS Non-Access Stratum
PLMN Public Land Mobile Network
PLMN ID PLMN Identity
RAN Radio Access Network
RRC Radio Resource Control
S1 Interface between eNB and CN.
S1AP S1 Application Protocol
S1-MME Control Plane of S1.
S-TMSI S-Temporary Mobile Subscriber Identity
TA Tracking Area
TAI Tracking Area Identity
TAU Tracking Area Update
UE User Equipment
UTRAN Universal Terrestrial Radio Access Network
X2 Interface between eNBs
xDSL X Digital Subscriber Line (X=A or V)

The invention claimed is:

1. A method for load balancing in a wireless communication system, said system providing a wireless service to at least one active user equipment, wherein a radio base station gateway is connected to at least two core network control nodes and to at least two radio base stations, said method characterised by the following steps, performed by the radio base station gateway:
   receiving a command for releasing a signaling connection associated with a user equipment due to load balancing, the command received from one of the core network control nodes in which at least one of said active user equipments is registered,
   receiving a message comprising a request for a signaling connection to a core network control node and a load balancing establishment cause, the message received from one of the radio base stations, and
   selecting a core network control node based on said load balancing establishment cause, when establishing the requested signaling connection.

2. The method according to claim 1, wherein the radio base station gateway comprises a counting device for each of said core network control nodes, and wherein the step of receiving a command also comprises the step of increasing by one the value of the counting device corresponding to the core network control node from which the command is received, and the step of selecting a core network control node comprises the sub steps of
   selecting a core network control node which has the value zero of said counting device, and
   decreasing by one the value of one of said counting devices which has a value larger than zero.

3. The method according to claim 1, wherein the received message also comprises an identifier of a user equipment, said identifier comprising an identity of the core network control node in which said user equipment is registered, and wherein the step of selecting a core network control node comprises the sub step of
   selecting another core network control node than the one corresponding to the core network control node identity comprised in said identifier.

4. The method according to claim 3, wherein the identifier of a user equipment is comprised in the request for a signaling connection in the received message.

5. The method according to claim 1, wherein the received message also comprises a core network control node identity, and wherein the step of selecting a core network control node comprises the sub step of selecting another core network control node than the one corresponding to said core network control node identity.

6. The method according to claim 1, wherein the wireless communication system is an SAE/LTE system, the core network control node is a MME, the radio base station is a Home eNodeB and the radio base station gateway is a Home eNodeB gateway.

7. A method for load balancing in a wireless communication system, said system providing a wireless service to at least one active user equipment, wherein a radio base station gateway is connected to at least two core network control nodes and to at least two radio base stations, said method characterised by the following steps, performed by a radio base station,
  receiving a connection request from a user equipment, said connection request initiating a connection establishment and comprising a load balancing establishment cause,
  sending a first message to the radio base station gateway, said first message comprising a request for a signaling connection to a core network control node and a load balancing establishment cause.

8. The method according to claim 7, wherein the connection request also comprises an identifier of the user equipment from which the connection request is received, said identifier comprising an identity of the core network control node in which said user equipment is registered, and wherein said first message also comprises said identifier.

9. The method according to claim 7, wherein the connection request also comprises an identity of the core network control node in which the user equipment from which the connection request is received is registered, and wherein said first message also comprises said core network control node identity.

10. The method according to claim 7, wherein the step of receiving a connection request comprises the further step of receiving from the user equipment a second message concluding the connection establishment, said second message comprising an identity of the core network control node in which the user equipment from which said second message is received is registered, and wherein said first message also comprises said core network control node identity.

11. The method according to claim 7, wherein the wireless communication system is an SAE/LTE system, the core network control node is a MME, the radio base station is a Home eNodeB and the radio base station gateway is a Home eNodeB gateway.

12. A method for load balancing in a wireless communication system, said system providing a wireless service to at least one active user equipment, wherein a radio base station gateway is connected to at least two core network control nodes and to at least two radio base stations, said method characterised by the following steps, performed by a user equipment,
  transmitting a connection request to a radio base station, said connection request initiating a connection establishment and comprising a load balancing establishment cause, and
  transmitting an identity of a core network control node in which said user equipment is registered.

13. The method according to claim 12, wherein said identity of a core network control node is transmitted in said connection request.

14. The method according to claim 13, wherein said identity of a core network control node is comprised in an identifier of said user equipment.

15. The method according to claim 12, wherein said identity of a core network control node is transmitted in a message concluding the connection establishment.

16. The method according to claim 12, wherein the wireless communication system is an SAE/LTE system, the core network control node is a MME, the radio base station is a Home eNodeB and the radio base station gateway is a Home eNodeB gateway.

17. A radio base station gateway for a wireless communication system adapted to provide a wireless service to at least one active user equipment, said radio base station gateway connectable to at least two core network control nodes and to at least two radio base stations, and characterised in that it comprises:
  a command receiving unit, arranged to receive a command for releasing a signaling connection associated with a user equipment due to load balancing, the command received from one of the core network control nodes in which at least one of said active user equipments is registered,
  a message receiving unit, arranged to receive a message comprising a request for a signaling connection to a core network control node and a load balancing establishment cause, the message received from one of the radio base stations, and
  a selecting unit, arranged to select a core network control node based on said load balancing establishment cause when establishing the requested signaling connection.

18. The radio base station gateway according to claim 17, further comprising a counting device for each of said core network control nodes, and wherein the command receiving unit is further arranged to increase by one the value of the counting device corresponding to the core network control node from which the command is received, and the selecting unit is arranged to select a core network control node which has the value zero of said counting device, and to decrease by one the value of one of said counting devices which has a value larger than zero.

19. The radio base station gateway according to claim 17, wherein the received message also comprises an identifier of a user equipment, said identifier comprising an identity of the core network control node in which said user equipment is registered, and wherein the selecting unit is arranged to select another core network control node than the one corresponding to the core network control node identity comprised in said identifier.

20. The radio base station gateway according to claim 19, wherein the identifier of a user equipment is comprised in the request for a signaling connection in the received message.

21. The radio base station gateway according to claim 17, wherein the received message also comprises a core network control node identity, and wherein the selecting unit is arranged to select another core network control node than the one corresponding to said core network control node identity.

22. The radio base station gateway according to claim 17, wherein the wireless communication system is an SAE/LTE system, the core network control node is a MME, the radio base station is a Home eNodeB and the radio base station gateway is a Home eNodeB gateway.

23. A radio base station for a wireless communication system adapted to provide a wireless service to at least one active user equipment, the radio base station connectable to a radio base station gateway, said gateway connectable to at least two core network control nodes, and the radio base station characterised in that it comprises,
  a receiving unit, arranged to receive a connection request from a user equipment, said connection request initiating a connection establishment and comprising a load balancing establishment cause, a sending unit, arranged to send a first message to the radio base station gateway, said first message comprising a request for a signaling connection to a core network control node and a load balancing establishment cause.

24. The radio base station according to claim 23, wherein the connection request also comprises an identifier of the user equipment from which the connection request is received, said identifier comprising an identity of the core network control node in which said user equipment is registered, and wherein said first message also comprises said identifier.

25. The radio base station according to claim 23, wherein the connection request also comprises an identity of the core network control node, in which the user equipment from which the connection request is received, is registered, and wherein said first message also comprises said core network control node identity.

26. The radio base station according to claim 23, wherein the receiving unit, is further arranged to receive from the user equipment a second message concluding the connection establishment, said second message comprising an identity of the core network control node in which the user equipment from which said second message is received is registered, and wherein said first message also comprises said core network control node identity.

27. The radio base station according to claim 23, wherein the wireless communication system is an SAE/LTE system, the core network control node is a MME, the radio base station is a Home eNodeB and the radio base station gateway is a Home eNodeB gateway.

28. A user equipment for a wireless communication system comprising a radio base station gateway connectable to at least two core network control nodes and to at least two radio base stations, said user equipment characterised in that it comprises:

a transmitter, arranged to transmit a connection request to a radio base station, said connection request initiating a connection establishment and comprising a load balancing establishment cause, and said transmitter further arranged to transmit an identity of a core network control node in which said user equipment is registered, to the radio base station.

29. The user equipment according to claim 28, wherein said identity of a core network control node is transmitted in said connection request.

30. The user equipment according to claim 29, wherein said identity of a core network control node is comprised in an identifier of said user equipment.

31. The user equipment according to claim 28, wherein said identity of a core network control node is transmitted in a message concluding the connection establishment.

32. The user equipment according to claim 28, wherein the wireless communication system is an SAE/LTE system, the core network control node is a MME, the radio base station is a Home eNodeB and the radio base station gateway is a Home eNodeB gateway.

* * * * *